United States Patent
Boesten et al.

(10) Patent No.: US 9,677,693 B2
(45) Date of Patent: Jun. 13, 2017

(54) UMBILICAL

(71) Applicant: DSM IP ASSETS B.V, Heerlen (NL)

(72) Inventors: Jorn Boesten, Echt (NL); Roelof Marissen, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 301 days.

(21) Appl. No.: 14/383,426

(22) PCT Filed: Mar. 11, 2013

(86) PCT No.: PCT/EP2013/054834
§ 371 (c)(1),
(2) Date: Sep. 5, 2014

(87) PCT Pub. No.: WO2013/135609
PCT Pub. Date: Sep. 19, 2013

(65) Prior Publication Data
US 2015/0034202 A1    Feb. 5, 2015

(30) Foreign Application Priority Data
Mar. 12, 2012  (EP) ..................... 12159089

(51) Int. Cl.
| F16L 11/00 | (2006.01) |
| H01B 7/00 | (2006.01) |
| F16L 11/02 | (2006.01) |
| G02B 6/44 | (2006.01) |
| H01B 7/18 | (2006.01) |
| H01B 7/24 | (2006.01) |
| H01B 7/04 | (2006.01) |

(52) U.S. Cl.
CPC ............ *F16L 11/02* (2013.01); *G02B 6/4427* (2013.01); *G02B 6/4432* (2013.01); *H01B 7/04* (2013.01); *H01B 7/182* (2013.01); *H01B 7/183* (2013.01); *H01B 7/24* (2013.01); *H01B 7/045* (2013.01)

(58) Field of Classification Search
CPC ....... F16L 11/10; F16L 9/12; Y10T 29/49826; Y10T 29/49879
USPC .......................... 138/113, 110, 123, 125, 174
See application file for complete search history.

(56) References Cited

U.S. PATENT DOCUMENTS

| 3,980,808 A | 9/1976 | Kikuchi et al. |
| 4,413,110 A | 11/1983 | Kavesh et al. |
| 6,472,614 B1 | 10/2002 | Dupont et al. |
| 6,538,198 B1 | 3/2003 | Wooters |
| 2007/0251694 A1 | 11/2007 | Ju et al. |
| 2010/0101833 A1 | 4/2010 | Zachariades |

FOREIGN PATENT DOCUMENTS

| EP | 0 205 960 | 12/1986 |
| EP | 0 213 208 | 3/1987 |
| EP | 0 200 547 | 7/1991 |
| EP | 0 472 114 | 2/1992 |
| EP | 169 9954 | 9/2006 |
| GB | 1 043 314 | 9/1966 |
| GB | 2 042 414 | 9/1980 |
| GB | 2 051 667 | 1/1981 |
| GB | 2 316 990 | 3/1998 |
| GB | 2 326 177 | 12/1998 |
| GB | 2 401 718 | 11/2004 |
| WO | WO 93/17176 | 9/1993 |
| WO | WO 01/73173 | 10/2001 |
| WO | WO 2005/124095 | 12/2005 |
| WO | WO 2011/073405 | 6/2011 |
| WO | WO 2011/131969 | 10/2011 |

OTHER PUBLICATIONS

International Search Report for PCT/EP2013/054834 mailed Jul. 10, 2013.
T. Nakajima, "Advanced Fiber Spinning Technology", Society of Fiber Science & Technology, ISBN 978-1-85573-182-0, 1995, 21 pages.
W. Sondhelm, "Technical Fabric Structures-1. Woven Fabrics", Handbook of Technical Textiles, chapter 4, 33 pages.
S. Anand, "Technical Fabric Structures-2. Knited Fabrics", Handbook of Technical Textiles, chapter 5, 35 pages.
P. Smith, "Technical Fabric Structures-3. Nonwoven Fabrics", Handbook of Technical Textiles, chapter 6, 22 pages.
S. Ogin, "Textile-Reinforced Composite Materials", Handbook of Technical Textiles, chapter 11, 18 pages.

*Primary Examiner* — Patrick F Brinson
(74) *Attorney, Agent, or Firm* — Nixon & Vanderhye P.C.

(57) ABSTRACT

The invention relates to an umbilical comprising a plurality of functional elements for providing hydraulic, electrical, signal and chemical functionality thereof, wherein at least some of the said functional elements comprise a fibrous sheath containing high strength polyolefin fibers.

15 Claims, No Drawings

UMBILICAL

This application is the U.S. national phase of International Application No. PCT/EP2013/054834 filed 11 Mar. 2013 which designated the U.S. and claims priority to European Patent Application No. EP 12159089.7 filed 12 Mar. 2012, the entire contents of each of which are hereby incorporated by reference.

The present invention relates to an umbilical comprising a plurality of functional elements for providing hydraulic, electrical, signal and chemical functionality, for example to and from a subsea installation. Such umbilical is mainly used in the offshore production of hydrocarbons, however, it can be also utilized in other industries where the transmission of at least power, signals and fluids needs to be combined in preferably one single device.

A known umbilical is disclosed in WO 2011/131969 and it comprises umbilical elements such as electrical cables, optical fibre cables and hoses as well as elements for carrying the loads acting on the umbilical. The load carrying elements of WO 2011/131969 are synthetic ropes comprising high strength organic fibers. Other disclosures of umbilicals reinforced with steel are given for example in U.S. Pat. No. 6,472,614; WO 93/17176; GB 2,316,990; U.S. Pat. No. 6,472,614; WO 2005/124095; US 2007/0251694; GB 2,326,177; WO 2005/124095 and U.S. Pat. No. 6,472,614.

The known umbilicals, in particular the one of WO 2011/131969 have several advantages, e.g. they can be used at greater water depths and/or under greater or more severe dynamic loading. They also have favorable mechanical properties especially in the axial direction, and may allow for easier manufacturing, installation and repair.

However, in particular during a subsea installation of an umbilical, several factors play an important role. Typically the umbilical, which is a complex layered system of tubes and cables, is installed from an installation platform by unwinding it from a storage device over a winch. It is already important to note that even during storage and transport, unwanted stresses may act upon the umbilical. During the installation process moreover, the umbilical is subjected to various loads, e.g. crush-loads stemming from the installation equipment, but also loads generated by winds and waves. It is further known that the highest loads and in particular the highest tensile and bending stresses are in the top section of the umbilical, i.e. the section closer to the installation platform. These loads, coupled with a too high or too low flexibility of the umbilical, may negatively influence the complex interactions between the layers thereof and introduce frictions between said layers which in turn may inflict damages to the umbilical.

Also, the complex interactions occurring inside of an umbilical and the requirements thereof pose challenges to design engineers. The increased demands for e.g. higher voltage, higher power, higher temperatures and pressures and lighter weight, especially for deep sea umbilicals may force the engineer to overdesign such systems, which in turn may lead to even more complex systems and/or higher costs.

It is therefore desired to provide an umbilical having the aforementioned disadvantages to a lower extent or not having them at all. In particular it is desirable to have an umbilical which has an optimal flexibility and can deal with the multitude of loads acting thereupon to achieve a favorable result under specified conditions. It is also desirable to have an umbilical which allows for a greater design freedom in view of specific requirements thereof.

The present invention provides an umbilical comprising a plurality of functional elements for providing hydraulic, electrical, signal and chemical functionality thereof, wherein at least some of said functional elements comprise a fibrous sheath containing high strength polyolefin fibers. Preferably, all of the functional elements providing hydraulic functionality to said umbilical contain said fibrous sheath, more preferably all of said functional elements contained by the umbilical comprises said fibrous sheath.

It was observed that the umbilical of the present invention, for simplicity also referred to as the inventive umbilical, has the flexibility required for preventing the deterioration of the functional elements contained thereof during its installation. In particular, it was observed that the flexibility of the inventive umbilical may be optimized in that the friction between the functional elements may be reduced below a deterioration threshold while also allowing for sufficient friction to ensure for a sufficient load sharing between the various elements of the umbilical as it is required during the installation of said umbilical.

A further advantage of the inventive umbilical is that it may allow for a safe and rapid installation. Once installed, the inventive umbilical may show an optimum dynamic fatigue response, i.e. an optimized load sharing between the various elements thereof.

Hereinafter, various preferred embodiments of the inventive umbilical are described. In a preferred embodiment, at least some of the functional elements contained by the inventive umbilical comprise the fibrous sheath, wherein the mass % of the fibrous sheath per functional element as calculated with regard to the total mass of said element is at least 0.1 mass %, more preferably at least 0.5 mass %, most preferably at least 1.0 mass %. Typically, in an umbilical, there is a difference between the masses of the various functional elements contained by the umbilical, e.g. the mass of the functional elements providing hydraulic functionality thereof may be different than the mass of functional elements providing signal or power functionality. It was observed that a greater design freedom and optimum properties may be achieved when tuning the mass % of the fibrous sheath with due regard to the functionality of a particular functional element. Preferably, the mass % of the fibrous sheath per functional element as calculated with regard to the total mass of said element is at most 25 mass %, more preferably at most 10 mass %, most preferably at most 5 mass %.

Preferably, at least part of the functional elements, more preferably all functional elements containing the fibrous sheath have an outer surface wherein the outer surface is formed by the fibrous sheath. In other words, typically, a functional element such as for example a power cable, has a wall comprising a layered structure. It is preferred that the outer layer contained by the wall of the functional element, contains the fibrous sheath.

The fibrous sheath contained by the functional elements of the inventive umbilical, may also be coated and/or impregnated with various materials enhancing various properties of said fibrous sheath or even providing functionality thereof. Any material suitable for coating or impregnation can be used in accordance with the present invention as for example melts of polymeric materials such as thermoplastics, thermosets and elastomers, more in particular polyolefins and polyolefin copolymers such as polypropylenes and polyethylenes, e.g. low density polyethylene (LDPE); liquid crystal polymers; acrylonitrile butadiene styrene copolymers (ABS); styrene-acrylonitrile copolymers (SAN); polyvinyl acetate (PVA) and ethyl-vinyl acetate (EVA) polyacrylates; polyamides; polybutadienes; epoxies; polyimides; silicon- and fluorosilicone-based rubbers and the like. Also liquid formulation such as suspensions of various solids into a liquid medium may be used. Preferably the liquid medium is water. Suitable examples of solid materials suitable for manufacturing said suspensions, and in particular water based suspensions, include polyurethanes, epoxies, waxes, rubbers and silicone based materials.

A fibrous sheath used in accordance with the present invention contains high strength polyolefin fibres. Preferred polyolefin fibers are fibers manufactured from homopolymers or copolymers of polypropylene or polyethylene. More preferably, the polyolefin is a polyethylene, most preferably an ultrahigh molecular weight polyethylene (UHMWPE). By UHMWPE is herein understood a polyethylene having an intrinsic viscosity (IV) of at least 3 dl/g, more preferably at least 4 dl/g, most preferably at least 5 dl/g. Preferably said IV is at most 40 dl/g, more preferably at most 25 dl/g, more preferably at most 15 dl/g. The IV may be determined according to ASTM D1601(2004) at 135° C. in decalin, the dissolution time being 16 hours, with BHT (Butylated Hydroxy Toluene) as anti-oxidant in an amount of 2 g/l solution, by extrapolating the viscosity as measured at different concentrations to zero concentration. Preferably, the UHMWPE fibers are gel-spun fibers, i.e. fibers manufactured with a gel-spinning process. Examples of gel spinning processes for the manufacturing of UHMWPE fibers are described in numerous publications, including EP 0205960 A, EP 0213208 A1, U.S. Pat. No. 4,413,110, GB 2042414 A, GB-A-2051667, EP 0200547 B1, EP 0472114 B1, WO 01/73173 A1, EP 1,699,954 and in "*Advanced Fibre Spinning Technology*", Ed. T. Nakajima, Woodhead Publ. Ltd (1994), ISBN 185573 182 7.

By fiber is herein understood an elongated body having a length dimension and transverse dimensions, e.g. a width and a thickness, wherein the length dimension is much greater that the transverse dimensions. The term fiber also includes various embodiments e.g. a filament, a ribbon, a strip, a band, a tape and the like having regular or irregular cross-sections. The fiber may have a continuous length, also referred to as a filament, or a discontinuous length in which case is referred to in the art as staple fibers. A preferred fiber for use in accordance with the invention is a filament having an essentially rounded cross-section. A yarn for the purpose of the invention is an elongated body containing a plurality of fibers.

The high strength polyolefin fibers used in accordance with the present invention are preferably fibers having a tensile strength of at least 0.5 GPa, more preferably of at least 1.2 GPa, even more preferably of at least 2.5 GPa, most preferably of at least 3.5 GPa. When the polyolefin fibers are UHMWPE fibers, said UHMWPE fiber preferably have a tensile strength of at least 1.2 GPa, more preferably of at least 2.5 GPa, most preferably at least 3.5 GPa. Preferably the polyolefin fibers have a tensile modulus of at least 30 GPa, more preferably of at least 50 GPa, most preferably of at least 60 GPa. Preferably the polyolefin fibers are UHMWPE fibers having a tensile modulus of at least 50 GPa, more preferably of at least 60 GPa, most preferably of at least 80 GPa.

Preferably, the polyolefin fibers and in particular the UHMWPE fibers employed by the invention have deniers in the range of from 0.5 to 20, more preferably from 0.7 to 10, most preferably from 1 to 5 dpf. If yarns containing said fibers are used to manufacture the fibrous sheath, preferably said yarns have deniers in the range of from 100 den to 3000 den, more preferably from 200 den to 2500 den, most preferably from 400 den to 1000 den.

In a special embodiment, the polyolefin fibers used in accordance to the invention have a tape-like shape or, in other words, said polyolefin fibers are polyolefin tapes. Preferably said polyolefin tapes are UHMWPE tapes. A tape (or a flat tape) for the purposes of the present invention is a fiber with a cross sectional aspect ratio, i.e. ratio of width to thickness, of preferably at least 5:1, more preferably at least 20:1, even more preferably at least 100:1 and yet even more preferably at least 1000:1. The tape preferably has a width of between 1 mm and 600 mm, more preferable between 1.5 mm and 400 mm, even more preferably between 2 mm and 300 mm, yet even more preferably between 5 mm and 200 mm and most preferably between 10 mm and 180 mm. The tape preferably has a thickness of between 10 µm and 200 µm and more preferably between 15 µm and 100 µm. By cross sectional aspect ratio is herein understood the ratio of width to thickness.

In a preferred embodiment, the fibrous sheath used in accordance with the invention contains a fabric, the fabric comprising the high strength polyolefin fibers. Said fabric may be of any construction known in the art, e.g. woven, knitted, plaited, braided or non-woven or a combination thereof. Knitted fabrics may be weft knitted, e.g. single- or double-jersey fabric or warp knitted. An example of a non-woven fabric is a felt fabric or a fabric wherein the fibers run substantially along a common direction in a substantially parallel fashion. Further examples of woven, knitted or non-woven fabrics as well as the manufacturing methods thereof are described in "*Handbook of Technical Textiles*", ISBN 978-1-59124-651-0 at chapters 4, 5 and 6, the disclosure thereof being incorporated herein as reference. A description and examples of braided fabrics are described in the same Handbook at Chapter 11, more in particular in paragraph 11.4.1, the disclosure thereof being incorporated herein by reference.

Most preferably, said fabric is a woven fabric. Preferred embodiments of woven fabrics include plain (tabby) weaves, rib weaves, matt weaves, twill weaves, basket weaves, crow feet weaves and satin weaves although more elaborate weaves such as triaxial weaves may also be used. More preferably the woven fabric is a plain weave, most preferably, the woven fabric is a basket weave. In one embodiment, the fibers used to manufacture the woven fabric are tapes. It was observed that a fibrous sheath containing such a woven fabric, may also reduce bursting of the umbilical, e.g. by excessive deformation of the various elements therein, and may also improve the stability of the umbilical. In particular, an umbilical showing less birdcaging and loop formation and kinking may be produced.

The inventive umbilical may also contain reinforcing elements, hereinafter referred to as primary reinforcing elements. The purpose of the primary reinforcing elements in an umbilical is to bear loads and in particular axial loads acting upon said umbilical. The primary reinforcing elements may be for example ropes running along the length of the umbilical, such as the ones disclosed in WO 2011/131969, or so called cages, e.g. webs around the umbilical. Preferably, such primary reinforcing elements also contain polyolefin fibers, more preferably UHMWPE fibers.

The inventive umbilical may be used in various application and may provide the following advantages:
i. Less incidents during transportation and/or installation;
ii. Optimum reliability and safety
iii. May allow for less design flaws and increased design freedom and optimization, e.g. a smaller, leaner and a lightweight design, which in turn may lead to extended service life.

Preferably, the inventive umbilical is a subsea umbilical, i.e. it is used to control subsea structures from an offshore platform, a floating vessel of from the shore. Subsea umbilicals provide various functionalities between said platforms, subsea equipment and shore.

The inventive umbilical can also be used as a downhole umbilical, i.e. an umbilical used to operate downhole equipment or surface-controlled-subsurface-equipment, e.g. safety valves.

Further particular umbilicals of the invention may be electro-hydraulic umbilicals for multiplexed systems; electro hydraulic control umbilicals; chemical injection control umbilicals; production well umbilicals; power optical umbilicals; air gun umbilicals; control umbilicals; Sub Sea Isolation Valve (SSIV) umbilicals; power umbilicals; topsides umbilicals; workover umbilicals; maintenance umbilicals; intervention umbilicals; completion umbilicals; and Remote Operated Vehicle (ROV) umbilicals.

Measuring Methods

Tensile properties, i.e. strength and modulus, of polyolefin fibers were determined on multifilament yarns as specified in ASTM D885M, using a nominal gauge length of the fibre of 500 mm, a crosshead speed of 50%/min and Instron 2714 clamps, of type Fibre Grip D5618C. For calculation of the strength, the tensile forces measured are divided by the titre, as determined by weighing 10 meters of fibre; values in GPa for are calculated assuming the natural density of the polymer, e.g. for UHMWPE is 0.97 g/cm$^3$.

The tensile properties of polyolefin tapes: tensile strength and tensile modulus are defined and determined at 25° C. on tapes of a width of 2 mm as specified in ASTM D882, using a nominal gauge length of the tape of 440 mm, a crosshead speed of 50 mm/min.

The invention claimed is:

1. An umbilical comprising a plurality of functional elements for providing hydraulic, electrical, signal and chemical functionality thereof, wherein at least some of the said functional elements comprise a fibrous sheath containing high strength polyolefin fibers.

2. The umbilical of claim 1 wherein the mass % of the fibrous sheath per functional element as calculated with regard to the total mass of said element is at least 0.1 mass %.

3. The umbilical of claim 1 wherein the mass % of the fibrous sheath per functional element as calculated with regard to the total mass of said element is at most 25 mass %.

4. The umbilical of claim 1 wherein the functional elements containing the fibrous sheath have an outer surface, wherein the outer surface is formed by the fibrous sheath.

5. The umbilical of claim 1 wherein the functional elements have a wall comprising a layered structure, wherein the outer layer contains the fibrous sheath.

6. The umbilical of claim 1 wherein the fibrous sheath is coated or impregnated with a thermoplastic, a thermoset or an elastomer.

7. The umbilical of claim 1 wherein the polyolefin fibers are fibers manufactured from homopolymers or copolymers of polypropylene or polyethylene.

8. The umbilical of claim 1 wherein the polyolefin fibers are fibers manufactured from ultrahigh molecular weight polyethylene (UHMWPE).

9. The umbilical of claim 1 wherein the polyolefin fibers have a tensile strength of at least 0.5 GPa.

10. The umbilical of claim 1 wherein the polyolefin fibers have deniers in the range of from 0.5 to 20.

11. The umbilical of claim 1 wherein the polyolefin fibers have a tape-like shape.

12. The umbilical of claim 1 wherein the polyolefin fibers have a tape-like shape with a width of between 1 mm and 600 mm and a thickness' of between 10 microns and 200 microns.

13. The umbilical of claim 1 wherein the fibrous sheath contains a fabric comprising the high strength polyolefin fibers.

14. The umbilical of claim 1 wherein the fibrous sheath contains a woven fabric comprising the high strength polyolefin fibers.

15. The umbilical of claim 1 being a subsea umbilical.

* * * * *